United States Patent [19]

Leo et al.

[11] Patent Number: 4,734,333

[45] Date of Patent: Mar. 29, 1988

[54] POSTFORMABLE ULTRAVIOLET CURABLE COATINGS

[75] Inventors: A. Frank Leo, Palatine; Clive J. Coady, Hanover Park, both of Ill.

[73] Assignee: DeSoto, Inc., Des Plaines, Ill.

[21] Appl. No.: 939,091

[22] Filed: Dec. 8, 1986

Related U.S. Application Data

[63] Continuation-in-part of Ser. No. 824,561, Jan. 23, 1986, abandoned, and a continuation-in-part of Ser. No. 914,990, Oct. 3, 1986.

[51] Int. Cl.$^4$ ............................................. B32B 27/00
[52] U.S. Cl. ................................. 428/423.1; 427/54.1; 428/35; 522/90; 522/96; 522/97; 138/145
[58] Field of Search ............... 427/54.1; 522/90, 96, 522/97; 428/35, 36, 423.1; 138/145

[56] References Cited

U.S. PATENT DOCUMENTS

| | | | |
|---|---|---|---|
| 3,559,280 | 2/1971 | Mailhidt et al. | 427/329 X |
| 4,205,018 | 5/1980 | Nagasawa et al. | 522/97 X |
| 4,210,713 | 7/1980 | Sumiyoshi et al. | 522/97 X |
| 4,264,752 | 4/1981 | Watson, Jr. | 522/97 |
| 4,303,696 | 12/1981 | Brack | 427/44 |
| 4,514,037 | 4/1985 | Bishop et al. | 427/54.1 X |

FOREIGN PATENT DOCUMENTS 0007265 1/1980 European Pat. Off. .

*Primary Examiner*—Thurman K. Page
*Attorney, Agent, or Firm*—Dressler, Goldsmith, Shore, Sutker & Milnamow, Ltd.

[57] ABSTRACT

A postformable ultraviolet curable primer coating composition is disclosed which consists essentially of: (A) from 10% to 80% of a linear acrylate-terminated polyurethane based on a polycarbonate diol; (B) from 2% to 35%, of acrylic acid; (C) from 15% to 65% of a monoethylenically unsaturated monomer having the rapid ultraviolet cure rate associated with acrylate monomers and having a glass transition temperature above 35° C.; (D) from 0% to 25% of a polyacrylate monomer; and (E) photoinitiator rendering the composition curable with ultraviolet light.

6 Claims, No Drawings

POSTFORMABLE ULTRAVIOLET CURABLE COATINGS

This application is a continuation-in-part of Ser. No. 824,561 filed Jan. 23, 1986, now abandoned and Ser. No. 914,990 filed Oct. 3, 1986.

DESCRIPTION

1. Technical Field

This invention relates to postformable ultraviolet curable coating compositions which are adapted to be employed as primers on galvanized steel surfaces, and especially tubing which may be formed after priming, it is essential that the primer remain adhered to the galvanized steel surface. Ultraviolet curable coating compositions which are solvent-resistant are included.

2. Background Art

Galvanized steel surfaces, and especially galvanized steel tubing, require prime coating to provide good corrosion resistance and to help adhere subsequently applied decorative coatings to the galvanized steel surface. In many instances, the primed galvanized steel tubing is formed, for example into swing sets, and then painted. When conventional acrylic-based ultraviolet-curable coatings were applied and cured on the galvanized steel surface, they would shrink away from the substrate when the paint was baked, thus removing the primer and the paint. This is obviously undesirable.

The primary objective of this invention is to provide an ultraviolet-curable coating composition which can be ultraviolet-cured on the galvanized steel substrate and which will withstand the postforming stresses and still resist the heat and solvent encountered when the primed steel is painted. On the other hand, it is also important to be able to provide new and more highly adherent ultraviolet-curable coatings for adhesion to various difficult to adhere to surfaces.

It has also been difficult to combine good solvent resistance and reasonable fabrication resistance in an ultraviolet-curable coating which is strongly adherent to the galvanized steel surface.

Accordingly, another objective of this invention is to provide an ultraviolet-curable coating composition which can be ultraviolet-cured on the galvanized steel substrate to provide a corrosion-resistant coating which will resist removal by solvents, such as methyl ethyl ketone, and which will also withstand moderate postforming stresses.

DISCLOSURE OF INVENTION

In accordance with this invention, a postformable ultraviolet curable coating composition consists essentially of: (A) from 10% to 80% of certain linear acrylate-terminated polyurethane based on a polycarbonate diol; (B) from 2% to 35%, preferably from 10% to 20%, of acrylic acid; (C) from 15% to 65%, preferably from 30% to 60%, of a monoethylenically unsaturated monomer having the rapid ultraviolet cure rate associated with acrylate monomers and having a glass transition temperature above 35° C., preferably above 55° C.; (D) from 0% to 25% of a polyacrylate monomer, it being understood that the greater the proportion and the higher the acrylate functionality, the greater the solvent resistance and the lower the postformability; and (E) photoinitiator rendering the composition curable with ultraviolet light.

when postformability is to be maximized, component (D) is largely omitted and it is preferred that the acrylate-terminated polyurethane based on a polycarbonate be present in an amount of 30% to 50%.

On the other hand, when greater solvent resistance is desired in combination with reasonable resistance to postforming stresses, the acrylate-terminated polyurethane based on a polycarbonate diol is present in an amount of from 10% to 40%, preferably 15% to 30%; component (B) [the acrylic acid] is present in an amount of from 5% to 25%, preferably from 10% to 20%; component (C) is present in an amount of from 25% to 50%, preferably from 30% to 40%; and component (D) is present in an amount of from 8% to 25%, preferably from 12% to 21%, and is selected to be a triacrylate monomer, such as trimethylol propane triacrylate.

The polycarbonate-based acrylate-terminated polyurethane provides the physical toughness to resist the postforming stresses and to provide good adhesion to the substrate, especially when the coating is subjected to an elevated temperature bake. The acrylic acid helps to lower viscosity and enhances the adhesion which resists delamination. Lastly, the high glass transition temperature monomer and its large proportion provide the hardness and crack resistance needed for primer utility. As a result, this combination of components provides an effective solution to a perplexing and difficult industrial problem. Lastly, the optional polyacrylate, preferably the triacrylate, provides enhanced solvent resistance when this is needed.

To provide coating compositions capable of forming films of the desired physical toughness and adhesion to difficult surfaces, like galvanized steel, we have found that one must rely upon certain linear diacrylate-functional polyurethanes which are more particularly defined hereinafter. These are broadly described as the linear polyurethane reaction product of polycarbonate diol with organic diisocyanate in molar proportions providing an average of at least about 2 urethane linkages per molecule, this linear polyurethane being end-capped with a monohydric acrylate, such as 2-hydroxyethyl acrylate.

The linear polyurethane formed by reacting the diol with excess diisocyanate is isocyanate terminated, and it may be end capped by reacting it with the monohydric acrylate. If the polycarbonate diol is used in excess, then the hydroxy-functional polyurethane formed by reaction with the diisocyanate can be end capped by reacting it with the monohydric acrylate after it has been adducted with an equimolar proportion of a diisocyanate, such as 2,4-toluene diisocyanate or isophorone diisocyanate. These diisocyanates possess one isocyanate group which is more strongly reactive than the other.

While one can use a two-stage reaction, as noted above, all the reactants can be reacted together in a single stage, and this is presently preferred and will be illustrated.

The relative proportions of the difunctional components can be varied, as is well known, to vary the molecular weight of the polyurethane, and thus the average number of urethane linkages which are present. As previously indicated, the polyurethane formed by reaction of the diisocyanate and the diol will contain an average of at least 2 urethane linkages per molecule, and the end capping of this polyurethane adds additional urethane linkages. It is preferred to have from 4 to 10 urethane linkages in the final acrylate-terminated polyurethane.

The acrylate-terminated polycarbonate diol polyurethanes which are used herein have the formula:

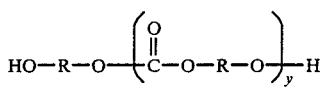

in which R is alkylene having from 2-20 carbon atoms, preferably 2-8 carbon atoms, and is illustrated by the ethylene, propylene and butylene radicals; y is at least 1, and R and y are selected to provide a molecular weight for the polycarbonate diol reactant of from 300 to 3000, preferably from 600 to 1500.

It is desired to point out that the polycarbonate diols, and also polyurethanes made therefrom by reaction with diisocyanates, are themselves known compounds, as illustrated in U.S. Pat. No. 4,264,752.

The acrylate-terminated polycarbonate diol polyurethanes used herein are combined with liquid components to provide the low coating viscosity which is needed and also to provide the strength and tensile modulus needed in the cured coatings. The acrylate-terminated polycarbonate polyurethane component allows these characteristics to be combined with the adhesion and stress resistance which is desired.

Many monoethylenically unsaturated monomers of high glass transition temperature and which cure rapidly on ultraviolet exposure are known for inclusion in radiation-curable coating compositions. These are generally monomers having a glass transition temperature above about 35° C., preferably transition temperature above about 35° C., preferably above 55° C., and are illustrated by isobornyl acrylate and dicyclopentenyl acrylate. These render the composition more fluid, which aids application, and increase the toughness of the cured coatings. These monomers must be other than acrylic acid which is discussed below.

In addition to the monomers described above, one must also use the previously specified proportion of acrylic acid. While this monomer has known drawbacks, it provides high cure speed in combination with superior adhesion to galvanized steel or other difficult substrate, and these characteristics are needed to maintain adhesion under stressful conditions.

As is itself known, the glass transition temperature of the monomer is measured on a homopolymer of the monomer.

One may optionally employ a small proportion of a liquid polyacrylate, such as hexane diol diacrylate, or trimethylol propane triacrylate, but the proportion of these should be minimized. Thus, even 10% of hexane diol diacrylate reduces postformability, especially when the acrylic acid content is minimized.

When it is desired to combine solvent resistance with moderate postformability, then the use of some polyacrylate has been found to be essential. Preferably, one can employ the previously discussed proportion of triacrylate which is preferably illustrated by trimethylol propane triacrylate. Other useful triacrylates are glyceryl triacrylate, pentaerythritol triacrylate, and the like. When too little triacrylate is used, the cured coatings are inadequately resistant to solvent attack, and when too much triacrylate is used, the cured coatings become unduly brittle and fail even moderate postforming testing.

Minor proportions of volatile nonreactive solvents, such as acetone or ethyl alcohol, may also be present to adjust viscosity, but this is not preferred because the rapid cure desired makes it difficult to volatilize away any large amount of solvent prior to ultraviolet exposure. The preferred compositions herein are solvent-free.

The end capping of the linear polyurethane can be achieved using any monohydric acrylate, including monohydric polyacrylate. Thus, while 2-hydroxyethyl acrylate was mentioned previously, and is a preferred agent for this purpose, one can also use 2-hydroxypropyl, 2-hydroxybutyl acrylate, glyceryl diacrylate and pentaerythritol triacrylate.

The radiation which will effect cure will vary with the photoinitiator which is used. The usual photoinitiators are ketonic, such as about 3% of diethoxy acetophenone. Other photoinitiators are illustrated by acetophenone, benzophenone, m-chloro acetophenone, propiophenone, thioxanthone, benzoin, benzil, anthraquinone, and the like. These photoinitiators may be used singly or in mixtures, and are present in an amount up to about 10% of the coating (usually 1-8%) when ultraviolet cure is intended.

Even visible light not too remote from the ultraviolet range may be employed using appropriate photoinitiators. These are illustrated by camphor quinone and coumarin which are used together with a tertiary amine, such as triethyl amine. Diphenylbenzoylphosphine is also useful in and near the ultraviolet range.

While topcoats or paints can be used to decorate the coated products of this invention, this is not necessary and can be omitted. Such topcoats are themselves well known and, when used, are preferably organic solvent solution coatings containing an hydroxy-functional resin, such as a polyester resin, in combination with an aminoplast curing agent, which is usually a melamine-formaldehyde condensate. These are typically cured by baking at a temperature of from 200° F. to 400° F.

All proportions herein are by weight based on the total weight of the solvent-free coating composition, unless otherwise stated. Also, the molecular weights of reactive materials is routinely calculated from the known formula and the measured reactivity, and this molecular weight designation will be used unless otherwise specified. This type of molecular weight designation is a number average molecular weight, and all molecular weights reported herein are of this character.

EXAMPLE 1

There were charged to a 250 ml three neck round bottom flask equipped with a thermometer, distilling column, heating mantle, magnetic stirrer, distilling head, air condenser, receiver and vacuum attachments, 59 grams of 1,4-hexanediol, 85.6 grams of diphenyl carbonate and 0.1 gram of sodium hydroxide. The flask was evacuated to a pressure of about 10 mm Hg and the mixture was stirred and heated to about 100° C. and kept at these conditions for about three hours during which slow phenol distillation was observed. After three hours the pressure was reduced to 1 mm Hg and the temperature raised to 120° C. for 1 hour to complete the phenol distillation. After 1 hour the residue was cooled to room temperature and acetic acid was added dropwise until the mixture was neutralized. A distillate of 75.5 grams of phenol and a residue of 53.2 grams of a polymeric carbonate diol having a number average molecular weight of 600 was recovered. This polycarbonate is a linear polymer having one hydroxyl group at each end thereof, so it is a polycarbonate diol. By varying proportions one can obtain a polycarbonate diol of any desired molecular weight.

EXAMPLE 2

| Component | Wt. (Gms.) | Wt. (%) |
|---|---|---|
| 1 1,6-hexane diol-based polycarbonate diol (MW = 1000) (See Note 1) | 1770.54 | 49.18 |
| 2 2-hydroxyethyl acrylate | 198.54 | 5.52 |
| 3 Dibutyl tin dilaurate | 1.8 | .05 |
| 4 Phenothiazine | 1.8 | .05 |
| 5 Isobornyl acrylate | 1080.0 | 30.0 |
| 6 Isophorone diisocyanate | 547.32 | 15.20 |

Note 1: a polycarbonate diol of the type shown in Example 1 having the specified molecular weight. PPG Industries, Inc. (Pittsburg, PA) Duracarb 122 may be used.

Charge components 1–5 to a clean, dry reactor under a nitrogen sparge, then change to a dry air blanket and heat to 60° C. while stirring. Discontinue heating and add component 6 over a 20–30 minute period while maintaining a temperature of 60°–65° C., cooling if necessary. When addition is finished, heat to maintain 60°–65° C. and continue stirring until the isocyanate content is less than 0.10%. Remove the resinous reaction product from the reactor and allow to cool to room temperature.

The product is an acrylate-terminated polycarbonate diol-based polyurethane in solution in isobornyl acrylate. This solution has a resin solids content of 70.7%, a viscosity of 77,787 centipoises, and is pink in color.

EXAMPLE 3

| Component | A | B | C | D |
|---|---|---|---|---|
| Solution of Example 2 | 45 | 45 | 57 | 45 |
| Isobornyl acrylate | 40 | 36.3 | 28.4 | 34.6 |
| Acrylic acid | 11.5 | 15.0 | 11.5 | 7.0 |
| Hexane diol diacrylate | — | — | — | 10.0 |
| Phenothiazine | 0.02 | 0.02 | 0.02 | 0.02 |
| Irgacure 184 | 3.48 | 3.68 | 3.08 | 3.38 |
| Properties | | | | |
| Viscosity | 1080 | 870 | 3360 | 1060 |
| Weight/Gal. | 8.793 | 8.605 | 8.951 | 8.625 |
| Cross-Hatch % Removed | 0 | 0 | 0 | 0 |
| Pencil Hardness | 2H | 3H | 3H | 3H |
| Methyl ethyl Ketone Rubs | 35 | 30 | 40 | 50 |
| Methyl ethyl Ketone Dip % Removed | 100 | 97 | 100 | 95 |
| 180° Bend % Removed | 0 | 0 | 0 | 5–10 |
| 180° Bend + Cross-Hatch % Removed | 5 | 0 | 5 | 50 |

Irgacure 184 is a product of Ciba-Geigy (Ardsley, NY). It is the compound 1-hydroxycyclohexyl phenyl ketone.

The coating compositions described above are sprayed upon hot dipped galvanized steel panels and cured with ultraviolet light to provide the properties noted in the above table.

More particularly, the coatings were applied in a thickness of about 0.6 mil and cured with ultraviolet light using an exposure of about 0.75 Joule per square centimeter.

The ultraviolet-cured coatings are hard and solvent-resistant, as is required for primer utility, and they strongly resist removal, even after extensive bending and cross-hatching (the coating is cut through to metal in a cross-hatched pattern). When the acrylic acid is minimized and a proportion of diacrylate incorporated, as in run D, the adhesion after bending and cross-hatching was greatly reduced in that 50% of the coating was removed.

Further tests demonstrate the excellent results noted above are also obtained by increasing the proportion of acrylic acid, up to about 30%.

The highly adherent coatings described above are especially adapted to the spray coating of galvanized steel tubing, but the coatings are also useful when applied to all sorts of difficult to adhere to surfaces, including glass, polyphenylene sulfide and silver-sputtered polyester (Mylar) surfaces.

EXAMPLE 4

| Component | |
|---|---|
| Solution of Example 2 | 30 |
| Isobornyl acrylate | 31.2 |
| Acrylic acid | 14 |
| Trimethylol propane triacrylate | 18.5 |
| Stabilizer (Note 1) | 0.03 |
| Flow control agent (Note 2) | 0.3 |
| Irgacure 184 | 3 |
| dimethyl phenyl ketone | 2.97 |
| Properties | |
| Viscosity (cps) | 260 |
| Cross-Hatch % Removed | 0 |
| Pencil Hardness | F |
| Methyl ethyl Ketone Rubs | 100+ |
| Methyl ethyl Ketone Dip | |
| 1 Min. % Removed | 0 |
| 180° Bend ($\frac{3}{8}''$ Mandrel) % Removed | 0 |

Irgacure 184 has been described previously.
Note 1 - butylated hydroxy toluene
Note 2 - Dihydroxy-functional polymethyl polysiloxane polyethoxylated to 50% with ethylene oxide to have a molecular weight of 6000 reacted with one molar proportion of isophorone diisocyanate and one molar proportion of 2-hydroxyethyl acrylate per hydroxy group to provide a silicone diurethane diacrylate (Dow Corning product Q4-3667 may be used as the polysiloxane polyethoxylate).

The coating compositions described above are sprayed upon hot dipped galvanized steel panels in a thickness of about 0.5 mil and cured with ultraviolet light using an exposure of about 0.75 Joule per square centimeter to provide the properties noted in the above table.

As is evident from the properties reported in the Table, the ultraviolet-cured coatings are reasonably hard and exhibit great solvent-resistance in combination with good adhesion to the substrate and good fabrication resistance. While the fabrication resistance can be greatly enhanced at the sacrifice of outstanding solvent resistance, as in runs A, B, and C, of Example 3, the achievement of the reported combination of results is a significant achievement.

The highly adherent coatings described above are especially adapted to the spray coating of galvanized steel tubing which are cured by passing the coated tubing at a speed of 35 feet per minute past a tandem of two 300 watt mercury arc ultraviolet lamps at a distance of about 6 inches from the coating. The coatings are also useful when applied to all sorts of difficult to adhere to surfaces, including glass, polyphenylene sulfide and silver-sputtered polyester (Mylar) surfaces.

As a matter of interest, when the triacrylate content is reduced to about 12%, the solvent resistance begins to fall off, some loss of coating being experienced in the dip test, and when the triacrylate content is increased to 22%, some cracking begins to be noticed in the $\frac{3}{8}''$ bending test.

What is claimed is:

1. A postformable ultraviolet curable highly adherent coating composition consisting essentially of: (A) from 15% to 30% of a linear acrylate-terminated polyurethane based on a polycarbonate diol, said polycarbonate diol having the formula:

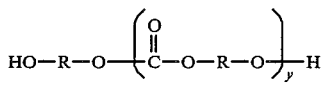

in which R is alkylene having from 2–20 carbon atoms; y is at least 1; and R and y are selected to provide a molecular weight for the polycarbonate diol reactant of from 300 to 3000; (B) from 10% to 20% of acrylic acid; (C) from 30% to 60% of a monoethylenically unsaturated monomer having the rapid ultraviolet cure rate associated with acrylate monomers and having a glass transition temperature above 55° C.; (D) from 8% to 25% of a triacrylate monomer; and (E) photoinitiator rendering the composition curable with ultraviolet light.

2. A coating composition as recited in claim 1 in which R has 2–8 carbon atoms and the molecular weight of the polycarbonate diol reactant is from 600 to 1500.

3. A coating composition as recited in claim 1 in which said monoethylenically unsaturated monomer is selected from the group consisting of isobornyl acrylate and dicyclopentenyl acrylate.

4. A prime-coated galvanized steel product comprising a galvanized steel product prime coated with an ultraviolet-cured coating of the composition of claim 1.

5. A coated galvanized steel product comprising a galvanized steel product prime coated with an ultraviolet-cured coating of the composition of claim 1.

6. A coated product as recited in claim 5 in which said galvanized steel product is a tube which is formed after said coating has been cured thereon.

* * * * *

UNITED STATES PATENT AND TRADEMARK OFFICE
CERTIFICATE OF CORRECTION

PATENT NO. : 4,734,333

DATED : March 29, 1988

INVENTOR(S) : A. Frank Leo et al.

It is certified that error appears in the above-identified patent and that said Letters Patent is hereby corrected as shown below:

Column 3, lines 34 and 35, after "35°C.,", delete:

-- preferably transition temperature above about 35°C., --.

Signed and Sealed this

Twentieth Day of September, 1988

Attest:

DONALD J. QUIGG

Attesting Officer

Commissioner of Patents and Trademarks